United States Patent
Kendziorra et al.

(10) Patent No.: US 11,999,203 B2
(45) Date of Patent: Jun. 4, 2024

(54) PNEUMATIC VEHICLE TIRE

(71) Applicant: Continental Reifen Deutschland GmbH, Hannover (DE)

(72) Inventors: Norbert Kendziorra, Garbsen (DE); Christian Weber, Garbsen (DE)

(73) Assignee: Continental Reifen Deutschland GmbH, Hannover (DE)

( * ) Notice: Subject to any disclaimer, the term of this patent is extended or adjusted under 35 U.S.C. 154(b) by 881 days.

(21) Appl. No.: 15/779,096

(22) PCT Filed: Aug. 18, 2016

(86) PCT No.: PCT/EP2016/069550
§ 371 (c)(1),
(2) Date: May 25, 2018

(87) PCT Pub. No.: WO2017/088994
PCT Pub. Date: Jun. 1, 2017

(65) Prior Publication Data
US 2018/0339559 A1  Nov. 29, 2018

(30) Foreign Application Priority Data
Nov. 26, 2015 (DE) ...................... 10 2015 223 393.6

(51) Int. Cl.
*B60C 19/08* (2006.01)
*B60C 9/00* (2006.01)
*B60C 11/00* (2006.01)

(52) U.S. Cl.
CPC ............ *B60C 19/082* (2013.01); *B60C 9/005* (2013.01); *B60C 9/0064* (2013.01);
(Continued)

(58) Field of Classification Search
CPC .................. B60C 19/08–088; B29D 2030/526
See application file for complete search history.

(56) References Cited

U.S. PATENT DOCUMENTS

2005/0087275 A1  4/2005 Zanzig et al.
2006/0102264 A1* 5/2006 Nicolas ................. B60C 19/08
                                                    152/152.1
(Continued)

FOREIGN PATENT DOCUMENTS

DE  10 2010 017 443 A1  12/2011
DE  102010017442 A1  12/2011
(Continued)

OTHER PUBLICATIONS

English machine translation of JP 2009-154608 A, Jul. 16, 2009.*
(Continued)

*Primary Examiner* — Adrienne C. Johnstone
(74) *Attorney, Agent, or Firm* — Gregory Adams; Richard Wolf

(57) ABSTRACT

A pneumatic vehicle tyre of radial type of construction, having a tread (1), having a carcass inlay (3), having electrically nonconductive sidewalls (7) and having at least one electrically conductive component (8) or element in a bead region, which component or element, in the case of a tyre mounted on a wheel rim, comes into contact with said wheel rim, wherein either the tread (1) is electrically conductive or, in the tread region, at least one electrically conductive component (10) is provided which is overlapped on the outside by the sidewalls (7) and which is connected in electrically conductive fashion to the tread outer surface, and wherein filaments provided with an electrically conductive coating are incorporated at least in a sidewall region, the coating of which filaments forms electrically conductive passages between the tread (1) or the component (10) and the at least one electrically conductive component (8) or element in the bead region.

5 Claims, 3 Drawing Sheets

(52) U.S. Cl.
CPC ............ *B60C 11/005* (2013.01); *B60C 19/08* (2013.01); *B60C 19/084* (2013.01); *B60C 19/086* (2013.01); *B60C 19/088* (2013.01)

(56) References Cited

U.S. PATENT DOCUMENTS

2008/0308203 A1* 12/2008 Kunisawa ............... B60C 19/08
152/152.1
2013/0174951 A1 7/2013 Schunack et al.
2016/0039252 A1 2/2016 Frerichs

FOREIGN PATENT DOCUMENTS

| DE | 102010037004 A1 | 2/2012 |
|---|---|---|
| DE | 102013104114 A1 | 10/2014 |
| EP | 2 939 855 A1 * | 11/2015 |
| JP | 2009154608 A | 7/2009 |
| WO | 2015098972 A1 | 7/2015 |

OTHER PUBLICATIONS

Mechanics of Pneumatic Tires, ed. Samuel Clark, US Department of Transportation, Aug. 1981, p. 225.*
Online definition of "upright", Random House Kernerman Webster's College Dictionary, K Dictionaries Ltd., 2010.*
English machine translation of EP 2 939 855 A1, Nov. 4, 2015.*

* cited by examiner

PNEUMATIC VEHICLE TIRE

BACKGROUND AND BRIEF SUMMARY OF THE INVENTION

The invention relates to a pneumatic vehicle tire in radial design having a tread, a carcass insert, electrically nonconductive sidewalls and at least one electrically conductive component or element in a bead region which comes into contact with the wheel rim when the tire is mounted thereon, wherein either the tread is electrically conductive or at least one electrically conductive component overlapped on the outside by the sidewalls has been provided in the tread region and is in electrically conductive connection with the outer surface of the tread, wherein filaments provided with electrically conductive coating have been introduced at least in one sidewall region, the coating of which forms electrically conductive passages between the tread or the component and the at least one electrically conductive component or element in the bead region.

It is known that tire components, especially the tread and sidewalls, can be manufactured from silica-filled rubber mixtures in order to reduce the rolling resistance. However, silica-containing rubber mixtures impart such a high electrical resistance to the rubber components manufactured therefrom that they are no longer electrically conductive, and so corresponding measures have to be taken to dissipate the electrostatic charges that occur in the course of driving. Electrical conductivity is also too low in the case of tire components made from those rubber mixtures containing carbon black in very small amounts and/or carbon black having a low activity/low BET.

A tire of the type mentioned in the introduction is known, for example, from DE 10 2010 017 444 A1. The tire has a carcass insert, on one side of which there are disposed filaments of cotton or PET having an electrically conductive coating. The filaments are particularly intended to remove air trapped between the carcass insert and the adjoining tire components (inner layer and/or sidewall) during the tire construction.

DE 10 2010 037 004 A1 discloses a pneumatic vehicle tire, the sidewalls of which consist of an electrically nonconductive rubber material. An electrically conductive element in the form of a thread, cable or strip is wound in a spiral around the sidewalls. The electrically conductive element is a metallic filament, a cord composed of the same, or a strip manufactured from an electrically conductive rubber mixture.

A pneumatic vehicle tire having a carcass insert adjoined by an applied layer manufactured from an electrically conductive rubber mixture is known from DE 10 2013 104 114 A1. The applied layer extends from the electrically conductive flange profile up to the superstructure of the tire.

It is an object of the invention, in a tire of the type specified at the outset, to enable the dissipation of electrostatic charges via the sidewalls which appropriately contain the "main conduction paths", by very simple measures which are easy to produce.

The stated object is achieved according to the invention in that the filaments have been set on the inside of the sidewall and the at least one electrically conductive component or element in the bead region in such a way that the electrically conductive coating of the filaments forms vulcanized electrically conductive passages both in the region of the interface between the sidewall and the at least one electrically conductive component or element in the bead region and in the region of the interface between the sidewall and the tread or the component in electrically conductive connection to the outer surface of the tread.

Tires executed in accordance with the invention therefore have, by virtue of the coating of filaments, electrically conductive passages formed in their sidewall regions that have been vulcanized and are therefore durable. The coated filaments can be mounted in a simple manner on the as yet unvulcanized, "raw" components in question. This measure can be integrated efficiently into existing tire manufacturing processes.

In a preferred embodiment of the invention, the electrically conductive passages originate from the electrically conductive coating of filaments which have each been set upright continuously over the inside of the sidewall and in contact with the at least one electrically conductive component or element in the bead region. The setting of the filaments having an electrically conductive coating on the inside of the sidewall can be integrated into the customary tire production process in a particularly simple manner.

In an alternative embodiment of the invention, which likewise enables simple production of the electrically conductive passages, the electrically conductive passages originate from the coating of filaments which have been set on the carcass insert at the radially outer end section of the sidewall, at the radially inner section of the sidewall and in contact with the at least one electrically conductive component or element in the bead region, and also in the region between the radially outer end section of the sidewall and the radially inner end section of the sidewall.

The electrically conductive component in the bead region may preferably be a rubber component present in the bead region, especially the flange profile which is in contact with the wheel rim in the bead region and typically consists of an electrically conductive rubber mixture.

The electrically conductive passages in the pneumatic vehicle tire may, in a further feature of the invention, run at least essentially in radial direction or else at an angle, especially of up to 60°, relative to radial direction. The number of electrically conductive passages provided in a tire executed in accordance with the invention may be kept relatively small. Preference is given to an embodiment in which the electrically conductive passages run at mutual distances of 5 cm to 15 cm.

In a particularly simple manner, it is possible to create electrically conductive passages of this kind which either originate from the coating of filaments of a weave or originate from the coating of filaments that have been set randomly with mutual contact.

The component in electrically conductive connection with the outer surface of the tread, in a preferred embodiment of the invention, is the tread base of the tread which comes into contact with at least one carbon center beam or the like that penetrates the tread cap.

Suitable filaments in the context of the invention have different electrically conductive coating. Preference is given to filaments having electrically conductive coating comprising electrically conductive particles, for example carbon black particles, graphite particles or carbon nanotubes, or having electrically conductive coating consisting of such particles. The electrically conductive coating may also consist of an elastomeric material, for example an adhesion promoter, preferably an RFL dip.

The filaments additionally include electrically nonconductive carrier filaments which have a corresponding coating and especially consist of rayon, polyester, polyamide or aramid.

BRIEF DESCRIPTION OF THE SEVERAL VIEWS OF THE DRAWINGS

Further features, advantages and details of the invention are now described in more detail on the basis of the drawing, which schematically shows exemplary embodiments of the invention. The figures show.

DETAILED DESCRIPTION OF THE INVENTION

Motor vehicle tires executed in accordance with the invention may be tires for trucks, vans, light trucks or utility vehicles.

Figure 1:
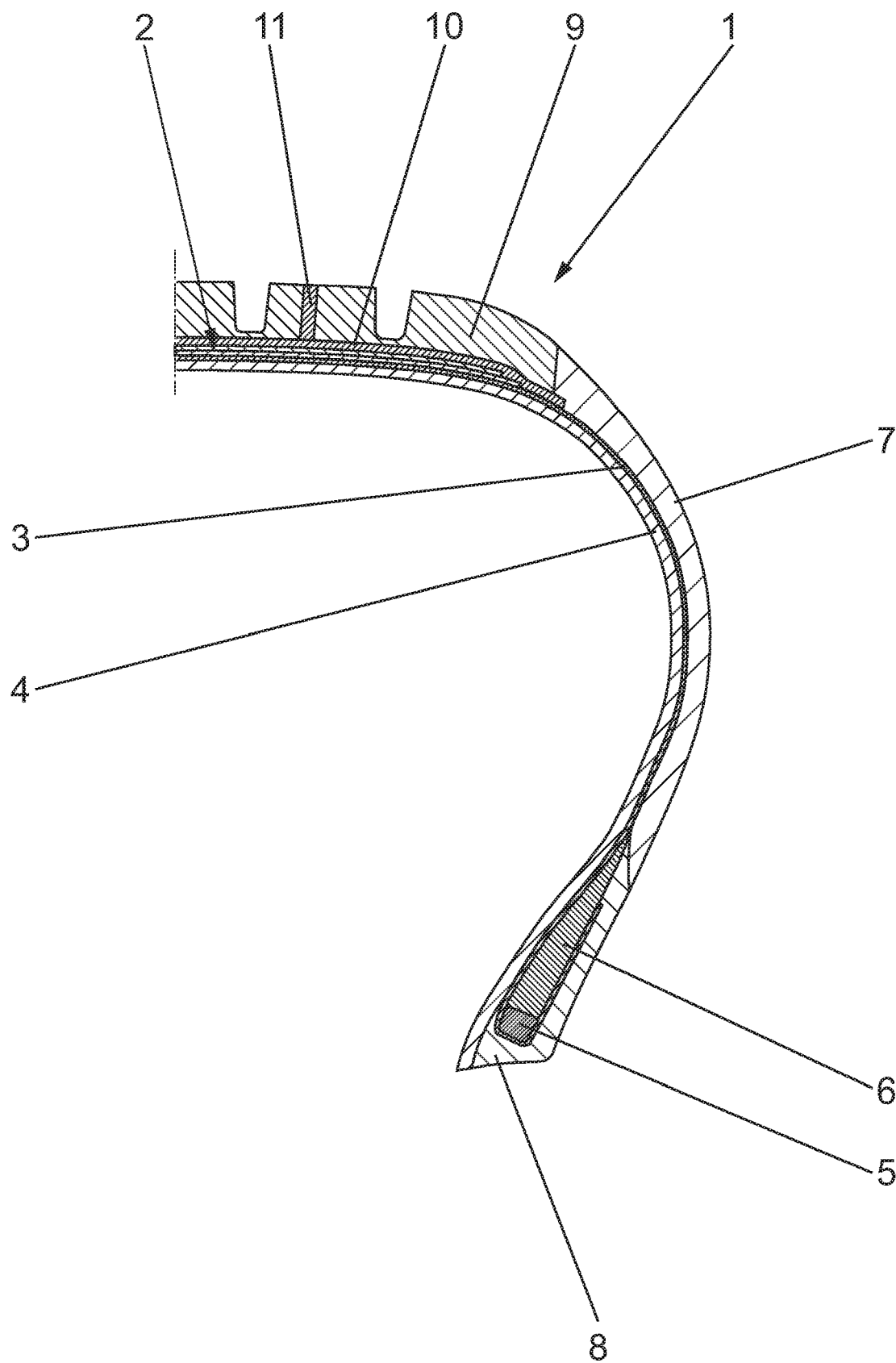
FIG. 1 a cross section through half of a pneumatic vehicle tire with one embodiment of the invention and FIG. 2 to FIG. 6 one view each of a section of a coextruded sidewall/flange profile with different embodiments of the invention.

FIG. 1 shows, of the standard components of a pneumatic truck tire in radial design, a tread 1, a multilayer belt package 2 disposed radially within the tread 1, a carcass insert 3 reinforced with strengthening members, an airtight inner layer 4, a bead core 5, a core profile 6 atop the bead core 5, a sidewall 7, and a flange profile 8. The second half of the pneumatic vehicle tire not shown in FIG. 1 is preferably executed correspondingly to that in FIG. 1.

The tread 1, in the variant embodiment shown, has a two-layer construction in radial direction and is composed of a tread cap 9 containing the profiling and a tread base 10 that runs radially within the tread cap 9, wherein the tread base 10 extends in axial direction across the entire width of the tread cap 9.

The tread base 10 has been manufactured from at least one rubber mixture comprising such a proportion of carbon black as filler that it is electrically conductive and therefore consists of an electrically conductive rubber material having an electrical resistance of $<1 \times 10^8$ ohms. The tread cap 9 has been produced from at least one rubber mixture containing silica (finely divided silica) as filler and accordingly consists of an electrically nonconductive rubber material.

An electrically conductive connection is assured between the tread base 10 and the outer surface of the tread, it being preferable, as in the working example shown, for an electrically conductive rubber strip 11 running in circumferential direction, called a carbon center beam, to be present within the tread cap 9, which extends essentially in radial direction and up to the outer surface of the tread and may have been manufactured from the rubber mixture of the tread base 10.

The radial belt package 2 within the tread 1 has two belt plies having electrically nonconductive belt rubberization, for example containing silica as filler. Any belt bandage present, which is preferably executed conventionally, likewise has electrically nonconductive rubberization.

The carcass insert 3 runs radially within the belt package 2 and along the sidewalls 7 into the bead regions, where it is wound around the respective bead core 5, forming a carcass turnup. The rubberization of the carcass insert 3 is also electrically nonconductive.

The sidewalls 7 each extend from the tread 1 as far as the respective flange profile 8. The radially outer end section of each sidewall 7 overlaps and forms contact from the outside with the tread base 10 and the tread cap 9. The radially inner end section of each sidewall 7 overlaps the flange profile 8 on the outside. Each sidewall 7 has been manufactured from an electrically nonconductive rubber mixture containing, for example, an appropriate proportion of silica as filler. The flange profiles 8 consist of electrically conductive rubber material. In the embodiment shown and described in more detail, therefore, by way of example, the flange profiles 8 are those electrically conductive components or elements in the bead regions which come into contact with the wheel rim when the tire is mounted thereon. It is also possible for other elements, components or installed components that can establish an electrically conductive connection of the sidewalls to the wheel rim to be provided in the bead regions and to be used for this purpose in the context of the invention.

Pneumatic vehicle tires executed according to the invention therefore have a number of components that are electrically nonconductive and preferably contain silica in the rubber material. As is known per se, this measure is advantageous for the rolling resistance of the tire and for the cutting and cracking resistance of the respective tire component. In order to assure dissipation of electrostatic charges from the electrically conductive elements, components or installed components that are in contact with the metallic wheel rim in the bead regions to the electrically conductive tread base 10, electrically conductive passages are provided at least in one of the sidewall regions in tires according to the invention.

FIG. 2 to FIG. 6 each show a view of the side of a circumferential section of a coextruded sidewall/flange profile that forms the inside in the finished tire, wherein the unvulcanized sidewall profile is labeled 7' in each case and the unvulcanized flange profile 8' in each case. According to the invention, filaments 12a to 12i that have been given an electrically conductive coating are mounted on the inside of the sidewall/flange profile, such that the coatings in the finished, vulcanized tire form electrically conductive passages or connections.

The electrically conductive filaments 12a to 12i, in a preferred embodiment, consist of a carrier filament composed of an electrically nonconductive material and having an outer coating or sheath of an electrically conductive material. The carrier filaments may consist, for example, of rayon, polyester, polyamide or aramid and may be a monofilament, a yarn or a cord consisting of multiple yarns. The electrically conductive coating is based, for example, on a suspension containing latex or another elastomer, and including electrically conductive particles, for instance carbon black particles or graphite powder, which assures the electrical conductivity of the coating. This coating can be produced by using, for example, a conventional adhesion promoter containing carbon black particles, which is liquid to such an extent that the carrier filament consisting of textile material can be coated by means of a dipping operation. It is possible by way of example to use an RFL dip (resorcinol-formaldehyde latex dip) incorporating carbon black particles, in particular N 339 particles or N 121 particles. The proportion of electrically conductive particles in the suspension is, for example, 10% by weight to 70% by weight, especially 30% by weight to 50% by weight. The electrically conductive coating of the carrier filaments may also consist exclusively of electrically conductive particles, for example carbon black particles, graphite powder or carbon nanotubes.

Figure 2:
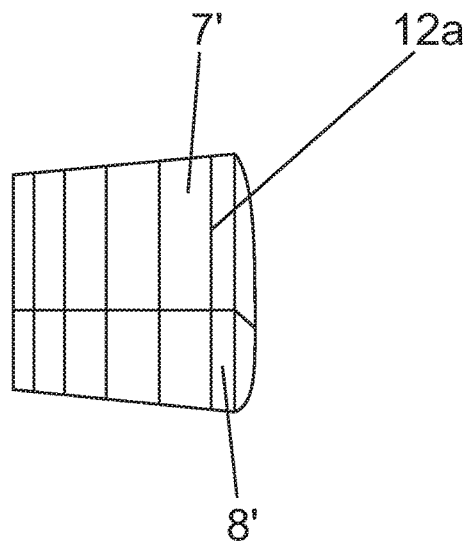

The inside of the sidewall/flange profile shown in FIG. 2 is endowed with electrically conductive filaments 12a that are continuous, i.e. each run essentially in a straight line and essentially parallel to one another across the sidewall profile 7' and the flange profile 8'. The filaments 12a have a distance from one another of preferably 5 cm to 15 cm.

Figure 3:
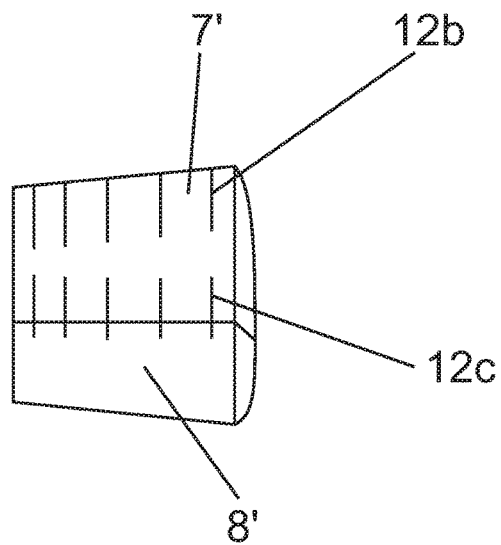

The inside of the sidewall/flange profile shown in FIG. 3 has been endowed with a radially outer array of filaments and a radially inner array of filaments, each of which consists of short electrically conductive filaments 12b, 12c running essentially in a straight line and essentially parallel to one another. The filaments 12b of the radially outer array of filaments have been mounted in the radially outer end section of the sidewall profile 7'; the filaments 12c of the radially inner array of filaments have been mounted such that they run partly in the radially inner end section of the sidewall profile 7' and partly in the radially outer section of the flange profile 8'. The mutual separation of the filaments is preferably 5 cm to 15 cm. The carcass insert 3 has likewise been endowed with electrically conductive filaments at least in that region opposite the gap between filaments 12b, 12c of the two arrays of filaments, such that the mutual contact of the coatings from the wheel rim up to the tread base creates continuous electrically conductive passages.

Figure 4:
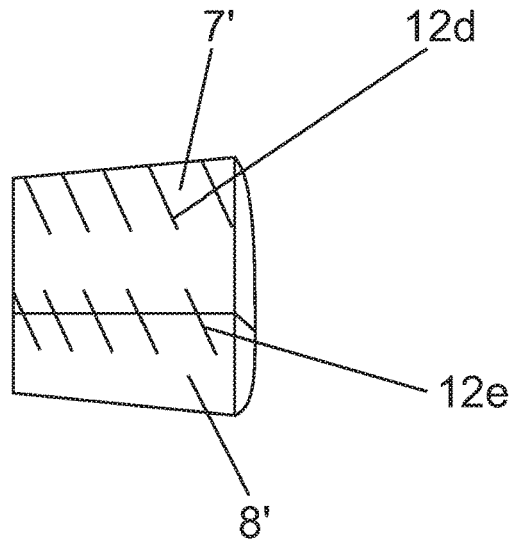

The sidewall/flange profile shown in FIG. 4 differs from that of FIG. 3 in that the electrically conductive filaments 12d, 12e have been set to run at an angle of up to 60°, preferably of at least 20°, to the radial direction.

Figure 5:
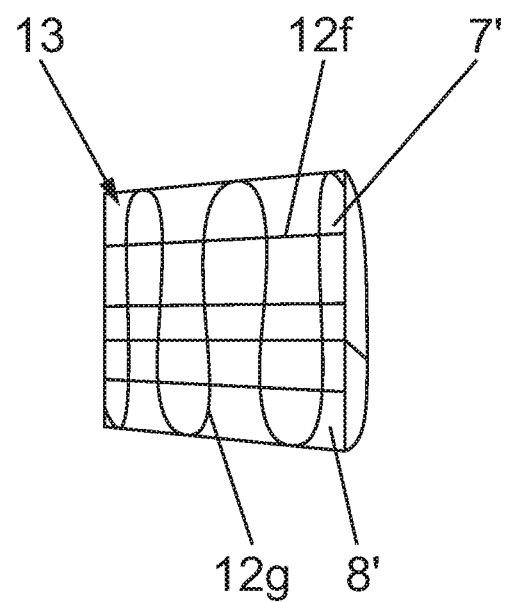

The inside of the sidewall/flange profile shown in FIG. 5 has been endowed with a weave 13 composed of electrically conductive warp threads 12f and electrically conductive weft threads 12g. In the working example shown, the width of the weave 13 has been matched to the dimensions of the sidewall/flange profile, such that the weft thread 12g runs essentially in radial direction and in the form of a wave across the sidewall profile 7' and the flange profile 8'.

Figure 6:
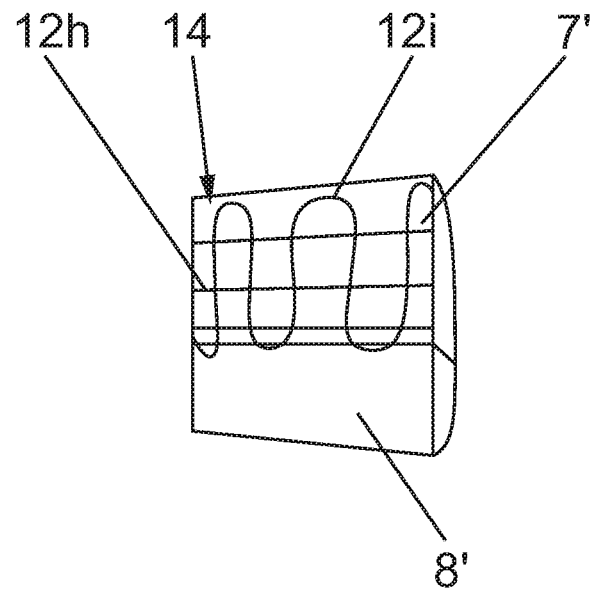

The inside of the sidewall/flange profile shown in FIG. 6 has been endowed with a narrow weave 14 composed of electrically conductive warp threads 12h and electrically conductive weft threads 12i. In the working example shown, the weft thread 12i projects just a little way into the flange profile 8'.

In further variant embodiments, weave pieces cut to appropriate size from such a weave are used.

In a further variant embodiment, relatively short electrically conductive filaments are set randomly, i.e. by chance and without orientation, and with mutual contact sites.

Rather than the electrically conductive tread base 10, it is also possible to provide another kind of electrically conductive connection between the sidewall 7 and the rubber strip 11.

LIST OF REFERENCE NUMERALS

1 . . . Tread
2 . . . Belt package
3 . . . Carcass insert
4 . . . Inner layer
5 . . . Bead core
6 . . . Core profile
7 . . . Sidewall
7' . . . Sidewall profile
8 . . . Flange profile
8' . . . Unvulcanized flange profile
9 . . . Tread cap
10 . . . Tread base
11 . . . Rubber strip
12a to 12i . . . Filaments
13, 14 . . . Weave

The invention claimed is:

1. A pneumatic radial tire intended to be mounted on a wheel rim, the tire comprising:
   a tread having a tread cap and a tread base, a carcass insert, a pair of electrically nonconductive sidewalls and a pair of bead regions, at least one of which having an electrically conductive component intended to come into contact with the wheel rim when the tire is mounted thereon; wherein
   the tread base is electrically conductive and is in contact with at least one carbon center beam that permeates the tread cap, as a result of which the tread base is in electrically conductive connection with the outer surface of the tread;
   filaments each provided with an electrically conductive coating are introduced in the region of at least one of the pair of sidewalls, the coating of the filaments forming electrically conductive passages between the tread base and the electrically conductive component in the at least one bead region, wherein an electrically conductive component, an electrically conductive connection and an electrically conductive coating are each one that has an electrical resistance of $<1\times10^8$ ohms; the at least one of the pair of sidewalls forms an interface with the electrically conductive component in the at least one bead region and forms an interface with the tread base; the filaments are set on the inside surface of the at least one of the pair of sidewalls and the at least one electrically conductive component in such a way that the electrically conductive coating of the filaments forms vulcanized electrically conductive passages both in the region of the interface between the at least one of the pair of sidewalls and the electrically conductive component in the at least one bead region and in the region of the interface between the at least one of the pair of sidewalls and the tread base in electrically conductive connection to the outer surface of the tread;
   the tread base is overlapped on the outside by the sidewalls;
   the filaments have each been set upright continuously over the inside surface of the at least one of the pair of sidewalls and in contact with the electrically conductive component in the at least one bead region; and
   the filaments terminate at the radially outer end of the inside surface of the at least one of the pair of sidewalls.

2. The pneumatic vehicle tire according to claim 1, wherein the electrically conductive component in the bead region is a rubber component.

3. The pneumatic vehicle tire according to claim 1, wherein the electrically conductive passages run at mutual distances of 5 cm to 15 cm.

4. The pneumatic vehicle tire according to claim 1, wherein the electrically conductive coating of the filaments consists of an elastomeric material.

5. The pneumatic vehicle tire according to claim 1, wherein the filaments comprise electrically nonconductive carrier filaments selected from the group consisting of rayon, polyester, polyamide or aramid.

* * * * *